June 23, 1959  A. P. GLENNY  2,891,407
GYROSCOPIC APPARATUS
Filed April 25, 1957
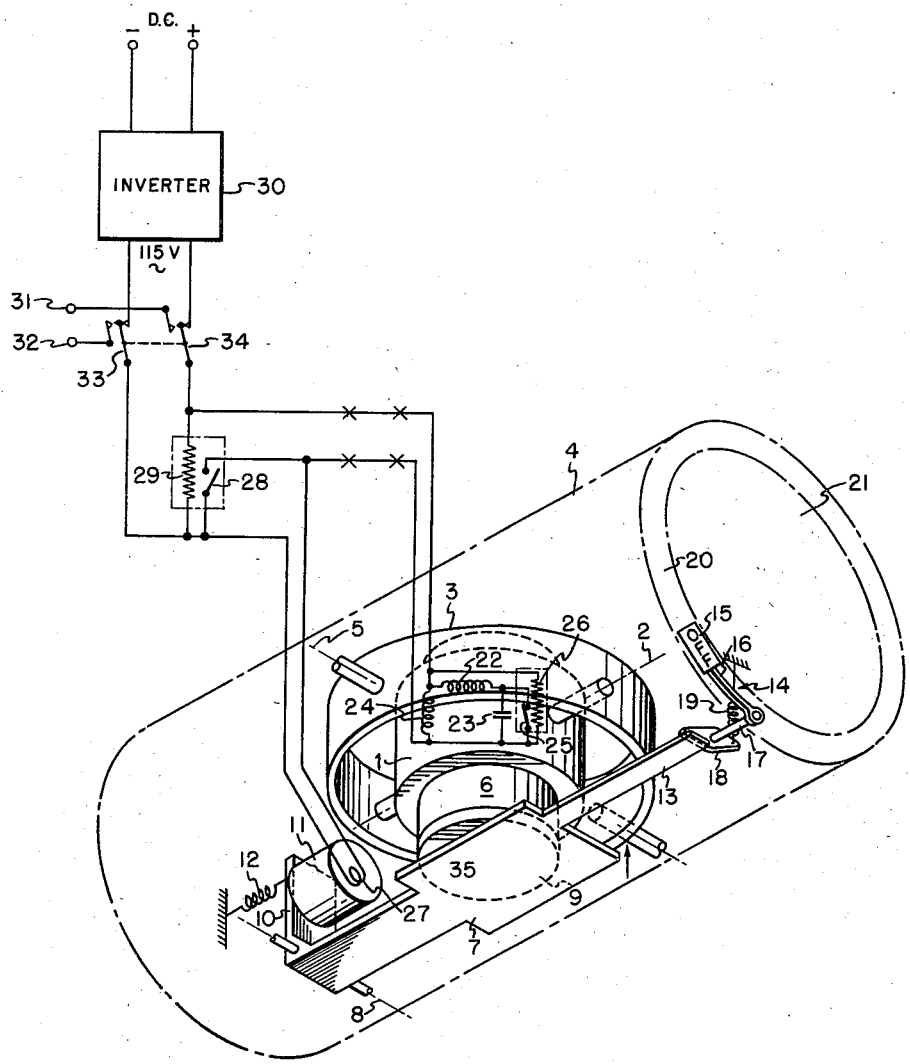
INVENTOR
ARTHUR PHILIP GLENNY
BY
ATTORNEY

2,891,407

GYROSCOPIC APPARATUS

Arthur Philip Glenny, Hanworth, England, assignor to The Sperry Gyroscope Company Limited, Brentford, Middlesex, England, a company of Great Britain Application April 25, 1957, Serial No. 655,088

Claims priority, application Great Britain April 27, 1956

10 Claims. (Cl. 74—5.1)

This invention relates to gyroscopic instruments and is particularly but not exclusively applicable to a gyroscopic instrument which can be effectively used even if a breakdown occurs in the normal alternating current supply of a craft in which the instrument is carried.

According to the invention, in a gyroscopic instrument which includes a rotor driven by an induction motor, an electrical circuit from which the induction motor is supplied, and means for changing the circuit condition at the termination of an initial starting period from a condition suitable for starting to a condition suitable for continuous running, the electrical circuit is adapted to be supplied from a single-phase source and the means for changing the circuit condition comprises an impedance, such as provided by the winding of a solenoid, connected in the single-phase supply to the motor and a switch having a pair of contacts which can be closed to short-circuit the winding. The switch is conveniently a thermally operated time delay switch.

The switch may be arranged to short-circuit the winding in a motor starting position so that a voltage higher than the normal voltage is initially applied to the motor to secure greater acceleration of the rotor towards its normal spin velocity. In the normal running position of the switch, the switch conditions the input circuit to the motor to include the winding.

The instrument may be provided with caging means biassed by a spring or the equivalent, while the impedance constitutes the winding of an electromagnetic transducer which is energized upon the opening of the contacts at the termination of the initial starting period and uncages the gyroscope against the action of the biassing means.

The impedance may constitute the winding of an electromagnetic transducer which is operated upon the opening of the switch contacts at the termination of the initial starting period to remove from the field of vision a warning device which indicates during the initial starting period that the instrument is in an off condition. The warning device may be mechanically connected to the caging means so that the same transducer serves to operate both.

In a preferred embodiment the induction motor driving the rotor is a capacitor motor having two stator windings of which a first one is connected in series with a condenser and the first winding and condenser are together connected in parallel with the second winding, while a second switch is provided in shunt with the condenser having contacts which are open when the motor is started but which subsequently close to short-circuit the condenser. Preferably the stator windings are wound in a manner to correspond with two of the three phase windings of a three-phase motor. The second switch is conveniently a thermal time-day switch.

The instrument may be a gyro vertical having mounted on its rotor frame or casing a ball erector with a ball housing providing a circular peripheral rim or corner directed away from the rotor casing and the caging means may include a plate member providing a plane surface which is arranged to be moved by the biassing means in an approximately vertical direction against the rim of the ball erector to cage the frame or casing. Further, a small projection or pip may be provided on the ball housing concentric with the rim, and arranged to bear against the plate member when the rim and plane surface are parallel and not quite touching each other.

The instrument may be used in combination with an electronic inverter arranged to derive a single-phase alternating voltage from a D.-C. source. The instrument circuit may have a pair of terminals for connection to a single phase of an ordinary A.-C. supply, and a ganged pair of switches adapted to disconnect the circuit from the ordinary supply and to connect it to the output terminals of the inverter.

In order that the invention may be clearly understood, an embodiment thereof will now be described by way of example with reference to the drawing which shows a diagrammatic view of a vertical gyroscope according to the invention for use in an attitude-indicating instrument.

The gyroscope includes a rotor frame or casing 1 containing a rotor (not shown) which is rotated about a vertical axis by an alternating current motor of the induction type (not shown). The casing 1 is pivoted about an axis 2 to a gimbal ring 3, and the gimbal ring 3 is pivoted to a housing 4 for the instrument about another axis 5. A ball erector 6 is mounted below the rotor casing 1 for maintaining the rotor axis vertical.

One of the elements of the caging means is provided by a lever 7 which is pivoted to the instrument housing 4 about an axis 8. A portion of the lever in the form of a flat plate 9 is spring-urged against the substantially flat lowermost portion of the ball erector 6 to engage the frame or casing 1 in caged condition when the motor is de-energised and during an initial starting period. The lever includes an upwardly-bent end 10 which forms an armature for co-operation with a solenoid 11, and also provides a point of attachment for the biasing means or spring 12 which tends to rotate the lever about axis 8 and hence holds the caging plate 9 against the ball erector 6 portion of the frame when the solenoid 11 is deenergised.

Further, the lever 7 is provided with an extension 13 for operating an indicator 14. The indicator 14 consists of a flag 15 carried on the end of an arm 16 which is mounted on a shaft 17. The shaft 17 is pivotally mounted in relation to the instrument housing 4 and carries at its other end a short lever 18 which extends in two opposite directions from its point of attachment to shaft 17. One end of lever 18 is connected to a biasing means or spring 19 tending to move the flag 15 to the periphery of housing 4, where it lies behind a rim 20 surrounding a viewing window 21 to indicate that the instrument is in an on condition.

The other end of lever 18 is pushed up from below by the extension 13 when the solenoid 14 is de-energized and the spring 12 moves the flat plate engaging portion 9 of the lever into cage engaging relation with the frame 1. The spring 12 is of course strong enough to overcome the effect of spring 19, besides providing the necessary force to effect caging. When the frame is caged, therefore, the flag 15 is visible through the window 21 to indicate that the instrument is in an off condition. When the solenoid 11 is energized, armature 10 moves the lever into its lowermost position against the influence of spring 12, the end of the lever 18 engaged by extension 13 is allowed to move downwards, and the spring 19 withdraws the flag 15 to a position behind the rim 20 where it indicates that the instrument is in an on condition.

Referring now to the circuit diagram forming part of the drawing, the induction motor driving the gyroscope rotor has one stator winding 22 connected in series with a capacitor 23, the winding 22 and capacitor 23 together being connected in parallel with another stator winding 24. The stator windings 22 and 24 are wound in such a manner as to correspond with two of the three phase windings of a three-phase motor. A thermally-operated time-delay switch 25 having a heating resistance 26 is arranged in parallel with capacitor 23, and is open when power is first applied to the windings, so that the motor first operates as a capacitor motor. The heat from the resistance 26 then effects closing of the contacts of switch 25 in a known manner, so that capacitor 23 is shorted out and the stator windings 22 and 24 are connected in parallel. The motor then operates as a single-phase motor.

The motor terminals are connected in series with winding 27 of solenoid 11 and a thermally-operated switch 28 having a heating resistance 29 is arranged in parallel with the winding 27 of the solenoid. The contacts of switch 28 are closed when heating resistance 29 is cold, so when the instrument is switched on, the winding 27 is shorted out. As a result, an abnormally high voltage is applied to the motor and this reduces the time taken by the rotor to reach normal operating speed. After a sufficient interval for this speed to have been reached, the heating effect of resistance 29 causes opening of the contacts of switch 28. This reduces the voltage applied to the motor to its normal value by reason of the impedance of solenoid winding 27. At the same time the solenoid operates through its armature to move the lever 7 downwardly away from the ball erector 6 to uncage the frame and to allow the flag 15 to move behind the rim 20. The disappearance of the flag indicates that the instrument is in an on condition. The input element of the transducer or solenoid 11 is provided by the winding 27. The mechanical output element of the transducer or solenoid 11 is provided by the armature 10 included as a part of the caging and flag conditioning lever 7. In the motor starting position of the time delay switch 28 in the input circuit connecting the source and the motor stator, the switch bypasses the input element or winding 27 of the transducer. In the normal running motor of the time delay switch 28, the switch includes the input element of the transducer in the input circuit. As represented in the drawing, the flag 15, solenoid 11, lever 7, switch 28, switch 25 and the motor stator are shown in an on condition of the instrument.

The instrument is provided with an electronic inverter 30 for deriving a single-phase alternating voltage from a D.-C. source, which may be a battery or an auxiliary D.-C. generator which could be wind driven. However, the instrument being described is intended to work normally off one phase of the three-phase output of a main generator. Accordingly, the circuit is provided with terminals 31, 32 for connection to one phase of the main generator output, and switches 33, 34 for switching in the inverter in the event of failure of the main generator. The drawing shows these switches in the position to connect the instrument circuit to the inverter.

The caging mechanism shown and described may be elaborated in the following manner without departing from the invention. In order to minimize variation in the solenoid flux the distance moved by the armature is reduced in relation to the distance moved by the plate 9 by mounting the armature not on the end of member 7 but on a lever pivoted about an axis which is above the level of the solenoid and parallel with the axis 8. The solenoid is raised somewhat in relation to the position shown in the drawing, and the distal end of the lever carrying the armature engages the upper end of the member 10 and urges it in the general direction of the rotor when the solenoid is energized.

Further, a hinge may be provided in the member 7 so that the size of the casing 4 can be kept as small as practical. This hinge provides an axis parallel with axis 8 and connects plate 9 with the portion of the lever further from extension 13. Relative angular movement of the two parts of member 7 about the hinge is limited by a suitable stop member so that the plate 9 lies precisely in the desired plane when fully engaging the ball housing. When the instrument is uncaged, the extension 13 or plate 9 comes against the lower wall of housing 4, or some member associated therewith, which prevents further downward movement of the part of member 7 further from pivot 8.

Accordingly, the member 7 bends about the hinge so that the plate 9 occupies in the uncaged state a position approximately parallel to its position in the caged state. The plate 9 may be not rectangular but circular, the diameter being somewhat greater than that of the ball erector rim.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an electrically operated gyroscopic instrument of the character including a pivotally mounted frame supporting a rotor, an alternating current motor with a wound stator on the frame operable to drive the supported rotor, and a source of single phase alternating current electrical energy; the combination of, a transducer having an electromagnetic input element and a mechanical output element, a time delay switch having a motor starting position and a normal running motor position, and an input circuit connecting the source to the motor stator through said transducer and switch in which said switch bypasses the input element of the transducer in the starting position and includes the input element of the transducer in the running position.

2. An instrument of the character claimed in claim 1, in which said switch is a thermal time delay switch that in the starting position provides a shunt for the input element and in the normal running position connects the input element and stator winding in series relation in the circuit.

3. An instrument of the character claimed in claim 1, in which said motor is a capacitor motor having two stator windings, a condenser in the circuit arranged in series relation to one of the motor windings and in parallel relation to the other of the motor windings, and including a second time delay switch having a motor starting position in which the condenser is included in the circuit and a normal running motor position in which the condenser is shorted from the circuit.

4. An instrument of the character claimed in claim 1, in which the mechanical output element of the transducer is a lever with a flat plate portion adapted to engage the rotor frame in caging relation, including means for biasing said lever to cage the frame, said transducer operating in the normal running position of the switch to overcome said biasing means.

5. An instrument of the character claimed in claim 1, in which the mechanical output element of said transducer is a lever, including pivotally mounted flag means for indicating off and on conditions of the instrument, means for biasing said flag means to indicate an on instrument condition, second biasing means for overcoming said first biasing means to indicate an off condition of the instrument including a connection between said lever and flag means, said transducer operating in the normal running position of the switch to overcome said second biasing means.

6. In an electrically operated gyro vertical of the character including a universally mounted frame supporting a rotor, an induction motor with a wound stator on the frame operable to drive the supported rotor, and a source of single phase alternating current electrical energy; the combination of, a solenoid having a winding and an armature, a caging lever for having a part engaging the frame and including the armature, a thermal time delay switch having a motor starting position and a normal running motor position, and an input circuit connecting the source to the motor stator including said solenoid and switch in which said switch bypasses the winding of the solenoid in the starting position and includes the winding of the solenoid in the running position, said armature operating to disable said caging lever upon inclusion of the solenoid winding in the input circuit.

7. A gyro vertical of the character claimed in claim 6, in which the switch shunts the solenoid winding from the circuit in its starting position and connects the solenoid winding in series in the circuit in its normal running postion.

8. A gyro vertical of the character claimed in claim 6, in which the frame engaging part of the caging lever is a flat plate.

9. In an electrically operated gyro vertical of the character including a universally mounted frame supporting a rotor, an induction motor with a wound stator on the frame operable to drive the supported rotor, and a source of single phase alternating current electrical energy; the combination of, a solenoid having a winding and an armature, a pivoted flag indicating off and on conditions of the instrument, means for biasing said flag to indicate an on instrument condition, and second biasing means for overcoming said first biasing means to indicate an off condition of the instrument having a lever with a part engaging the flag and including the armature, a thermal time delay switch having a motor starting position and a normal running motor position, and an input circuit connecting the source to the motor stator including said solenoid and switch in which said switch bypasses the winding of the solenoid in the starting position and includes the winding of the solenoid in the running position, said armature operating upon inclusion of the solenoid winding in the input circuit to the motor stator to overcome said second biasing means and thereby restore the flag to an on instrument condition under the influence of said first biasing means.

10. A gyro vertical of the character claimed in claim 9, in which the switch shunts the solenoid winding from the circuit in its starting position and connects the solenoid winding in series in the circuit in its normal running position.

References Cited in the file of this patent

UNITED STATES PATENTS

| | | |
|---|---|---|
| 1,944,090 | Lukens | Jan. 16, 1934 |
| 2,589,873 | Seifried | Mar. 18, 1952 |
| 2,795,142 | Smith | June 11, 1957 |